(12) United States Patent
Santos Gómez et al.

(10) Patent No.: US 8,122,576 B2
(45) Date of Patent: Feb. 28, 2012

(54) POSITIONING, HANDLING AND ASSEMBLING SYSTEM FOR MANUFACTURE OF AERONAUTICAL PARTS

(75) Inventors: José Manuel Santos Gómez, Pinto (ES); José Manuel Menéndez Martín, Boadilla Del Monte (ES); Antonio Durán Quiroga, Madrid (ES); Aquilino García García, Madrid (ES); Julián Sánchez Fernández, Leganés (ES)

(73) Assignee: Airbus Operations, S.L., Getafe, Madrid (ES)

( * ) Notice: Subject to any disclaimer, the term of this patent is extended or adjusted under 35 U.S.C. 154(b) by 169 days.

(21) Appl. No.: 12/387,302

(22) Filed: Apr. 30, 2009

(65) Prior Publication Data

US 2010/0154186 A1    Jun. 24, 2010

(30) Foreign Application Priority Data

Dec. 22, 2008  (ES) .................. 200803645

(51) Int. Cl.
*B21K 1/44* (2006.01)
*B21D 53/88* (2006.01)
(52) U.S. Cl. ............................. 29/7; 29/897.2
(58) Field of Classification Search .......... 29/33 C, 29/7, 897.2, 897.32; 700/262, 121, 41
See application file for complete search history.

(56) References Cited

U.S. PATENT DOCUMENTS 6,735,866 B2 * 5/2004 Nogueroles Vines et al. ........... 29/897.2

FOREIGN PATENT DOCUMENTS

| EP | 1 134 070 A1 | 9/2001 |
|----|--------------|--------|
| EP | 1 543 941 A1 | 6/2005 |
| EP | 1 800 826 A2 | 6/2007 |
| JP | 03005568 A   | 1/1991 |
| JP | 08231048 A   | 9/1996 |
| JP | 2004-130463 A | 4/2004 |

* cited by examiner

Primary Examiner — John C Hong
(74) Attorney, Agent, or Firm — Klauber & Jackson LLC (57) ABSTRACT

The system has special application in the manufacture of aircraft wing covers (10 made of carbon fiber and the stringers (3) cured jointly with the wing cover during the polymerization in autoclave. The tool pieces (4) being used are defined by angular elements (5, 6) copying the geometry of the stringers (3). The shape of these stringers corresponds to the "T" section. The angular elements (5, 6) comprise, in their upper part, a pair of battlements (7) in order to be caught by part of the clamps (9) of a head (10) linked to a robot (11) of the spherical type with articulated arm with six axes. The angular elements (5, 6) are made of INVAR material and they are used to keep in position the stringers during the curing cycle in the autoclave.

4 Claims, 7 Drawing Sheets

POSITIONING, HANDLING AND ASSEMBLING SYSTEM FOR MANUFACTURE OF AERONAUTICAL PARTS

OBJECT OF THE INVENTION

As stated in the title of this descriptive specification, the present invention relates to a positioning, handling and assembling system for the manufacture of aeronautical parts made of composite material, which permits the preparation, including the positioning and extraction of the tools used in the manufacture of parts in the aeronautical industry.

BACKGROUND OF THE INVENTION

In recent decades a major impulse has been given to the introduction of advanced composite materials in the aeronautical industry, replacing the aluminum alloys in the manufacture of large primary structures of commercial aircraft: lifting surfaces (wings and stabilizers) and fuselage.

These composite material structures do not differ greatly from their metal predecessors: covers or skins formed from two-dimensional panels (commonly known as skins), stiffened by means of beam type elements (stringers), and in turn supported by structural elements that maintain the geometry of these panels and provide the structure with overall rigidity: ring-frames in the case of fuselages and spars and ribs in the case of lifting surfaces.

This intensive introduction of composite materials has been possible thanks to improvements in the techniques and devices for automatic stacking and cutting of laminates obtained from belts consisting of reinforcement fibers preimpregnated with polymer resins and, in recent years, to improvements in the techniques of automatic forming and positioning of stringers. Nevertheless, there still exists a very high percentage of manual operations associated both with the process of joining the stringers and with the placement and removal of the tools associated with them.

There exist various manufacturing processes with composite material for achieving the joining of all the parts making up a stiffened cover. The most notable are: co-curing, co-bonding and secondary bonding. The chosen process influences the mechanical characteristics, the manufacturing costs and the geometric characteristics.

Co-curing is done with the two components fresh, in such a way that the two are effectively cured together in order to form a single piece. It has a very good structural behavior and is carried out in a single curing cycle, but very complex tools are needed in order to be able to do this.

Co-bonding uses an adhesive to join the cured component and the fresh component during the curing cycle of the fresh component. It presents a very good structural behavior and less complex tools than in the previous case, but it has the drawback that two curing cycles need to be used.

Secondary bonding also uses an adhesive, but in this case for joining two previously cured components. It presents a good structural behavior and the manufactured pieces can be stored without any special conditions, but it too needs two curing cycles.

In this case the proposed solution is applied in a co-bonding process since the tools in this case are simpler, but the applicability of the invention depends on the tools, not on the type of process.

The general stages of the manufacturing process for a composite material component are: preparation of the tools, laying the fiber, cutting, hot forming, preparation of the vacuum bag, polymerization in autoclave, removing from the mold, trimming and inspection.

So far, the positioning, handling and assembling process for tools has been mainly carried out manually since its automation was fairly complex on account of the configuration and shape of the tools used in the manufacture of carbon fiber parts. The tools used here and also the system that is advocated permits these operations to be automated in addition to ensuring the correct manufacture of the part.

The system prevents any delaminations occurring when the tool is removed, it places (or removes as appropriate) the tool properly thanks to the optical positioning system and it ensures the correct placement of a tool with respect to the attached tool piece.

SUMMARY OF THE INVENTION

In general terms, the positioning, handling and assembling system for the manufacture of aeronautical parts, constituting the object of the present invention, arises from the need to reduce the amount of time and human resources employed in the manufacture of carbon fiber aeronautical parts, more specifically in the manual operations of preparation, positioning and assembling of the tools used for the manufacture of covers which make this into a high cost process.

The system comprises a spherical type robot with articulated arm with six axes, provided with a special head for handling the tools, an external axis that allows the robot to move, some containers for storage of the removed tools and an optical system that permits positioning of the robot.

The tools of the stringers are "L" shaped sections of angular elements made of INVAR material. The angular elements copy the geometry of the piece on which they rest (covers) and the entire external surface of the stringers. These tools have some "battlements" in the upper part of the core in order to facilitate their handling and removal. In this way, an interface between the angular element and the robot is achieved which is integrated into the actual element with a saving of INVAR material, ensuring the closure of the pairs of angular elements and facilitating the adaptation of the vacuum bag in this zone. The smoothness of its shape does not damage the vacuum bag.

Provided in the upper part of the "battlements" are some small grooves, or small projecting ribs, which prevent the tool from falling when it is held by the head in the vertical position since this head has certain complementary securing means.

The steps, which are followed for positioning the angular elements, are the following:

1.—The robot automatically picks up the corresponding tool piece (INVAR angular element) with the special head that it possesses. The system at all times knows if it has a tool held in the clamps or not thanks to the fact that the head has a special presence sensor.

2.—The robot places the tool in the appropriate position thanks to an optical control system.

3. Once the angular element has been placed in position, the robot collects the following tool piece and places it next to the first one or wherever it corresponds. This is done so on successively until all the sections of angular elements corresponding to one of the faces of a stringer have been placed in position. The angular elements of the other face are then placed in position and after the stringer is then introduced between the angular elements. The array is then positioned on the cover and introduced into an autoclave for curing.

When the cover emerges from the autoclave and is again positioned in the zone of the robot, the tool pieces placed in the previous stages are then proceeded to be extracted by means of the following operations:

4.—In order to carry out this operation, the robot has a head that is adjusted to the battlements of the angular elements. This head has two clamps which, once the head has been positioned correctly, grasp the angular element by the battlements. Although the length of the tools is not the same, the distance between the battlements is indeed the same, so that the head of the robot does not have to change the distance between the clamps. A rotation is then made in order to separate the angular element from the stringer and the rest of the angular elements. Each pincer has an extension in one of its faces in order to prevent the deformation of the angular element when this rotation movement is carried out.

The extraction process has to be carried out following the right order since the angular elements have zones of attachment with each other.

5.—Once the tool piece has been separated, it is again positioned in the appropriate storage zone.

6.—These operations are repeated until the cover is completely removed from the mold.

The containers for the tools are also found within the area of the robot.

In order to facilitate an understanding of the characteristics of the invention and forming an integral part of this descriptive specification, some sheets of planes are attached in which, by way of illustration and non-limiting, the following has been represented:

DESCRIPTION OF THE PREFERRED FORM OF EMBODIMENT

Figure 1:
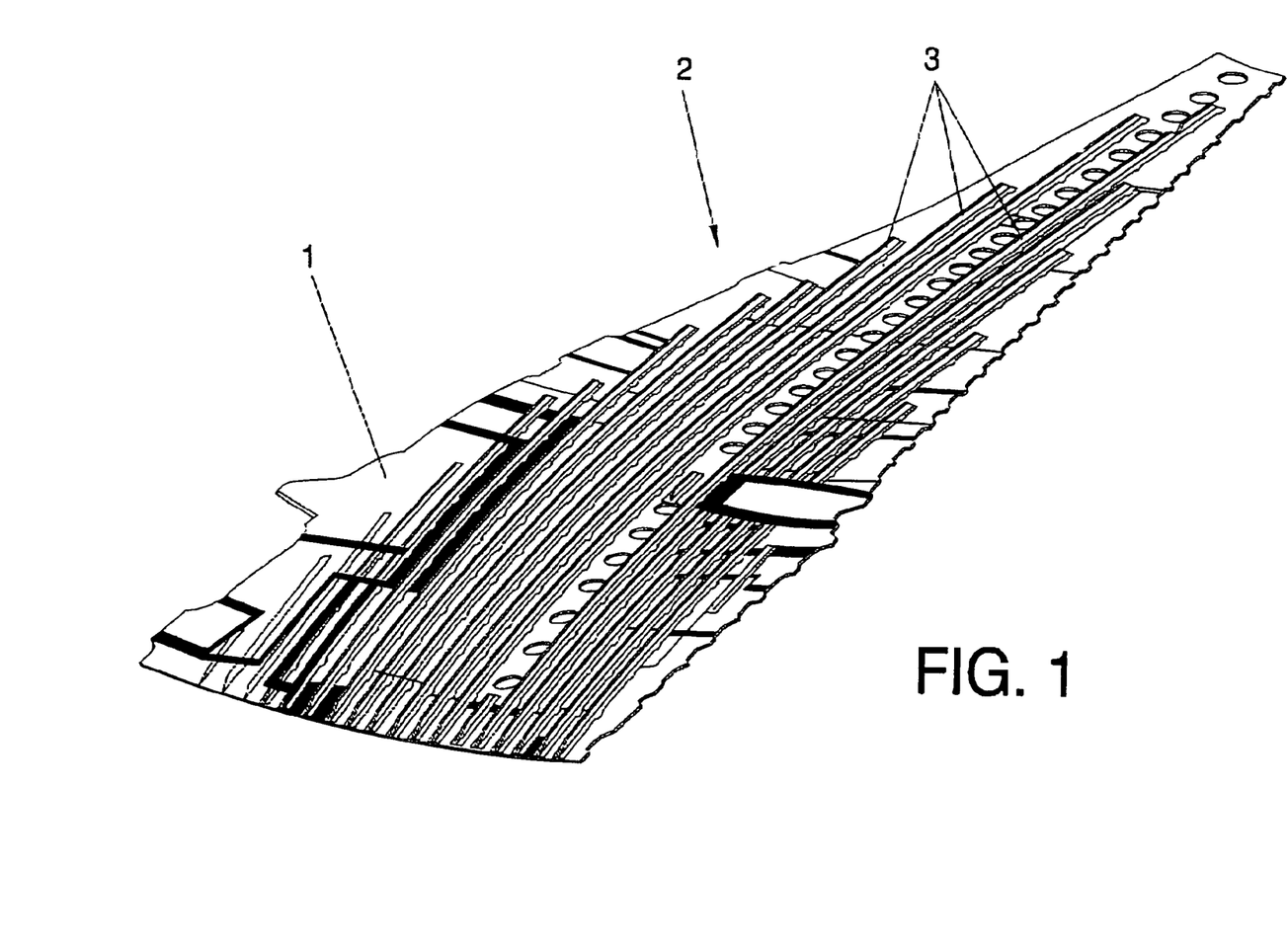
FIG. 1.—Is a partial perspective view of a cover and stringers of an aircraft wing to be constructed with the system forming the object of the invention.

Making reference to the numbering adopted in the figures, we can see how the positioning, handling and assembling system for the manufacture of aeronautical parts, which the invention proposes, achieves the objectives sought for the manufacture of this type of highly delicate parts, as it is the cover 1 of an aircraft wing 2 (see FIG. 1) where the lower surface of the cover 1 has an array of stringers 3 with "T" section fixed by the cross-member.

Figure 2:
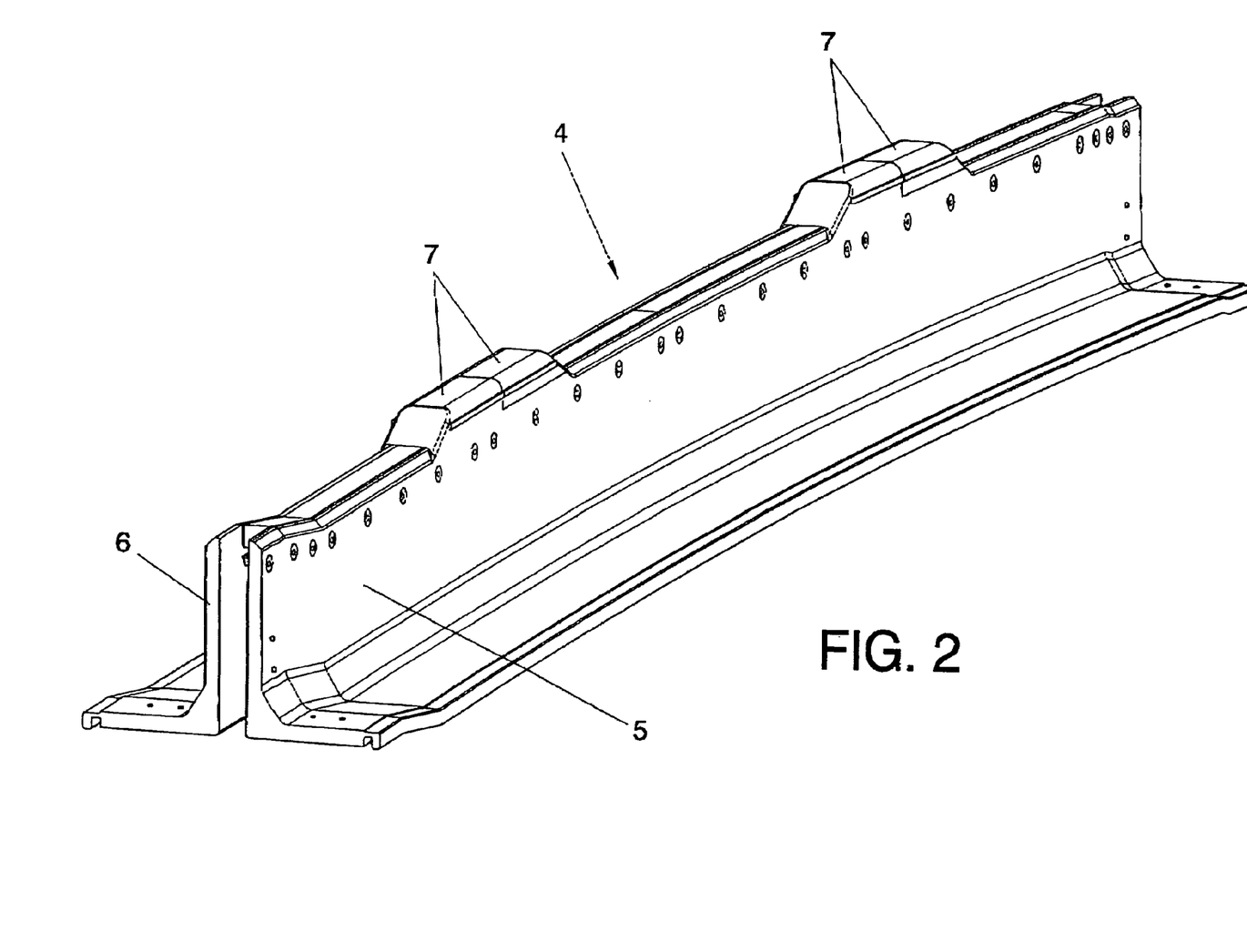
FIG. 2.—Is a perspective view of a tool piece, defined by two angular elements between which the stringer will be placed for joining to the cover.
Figure 4:
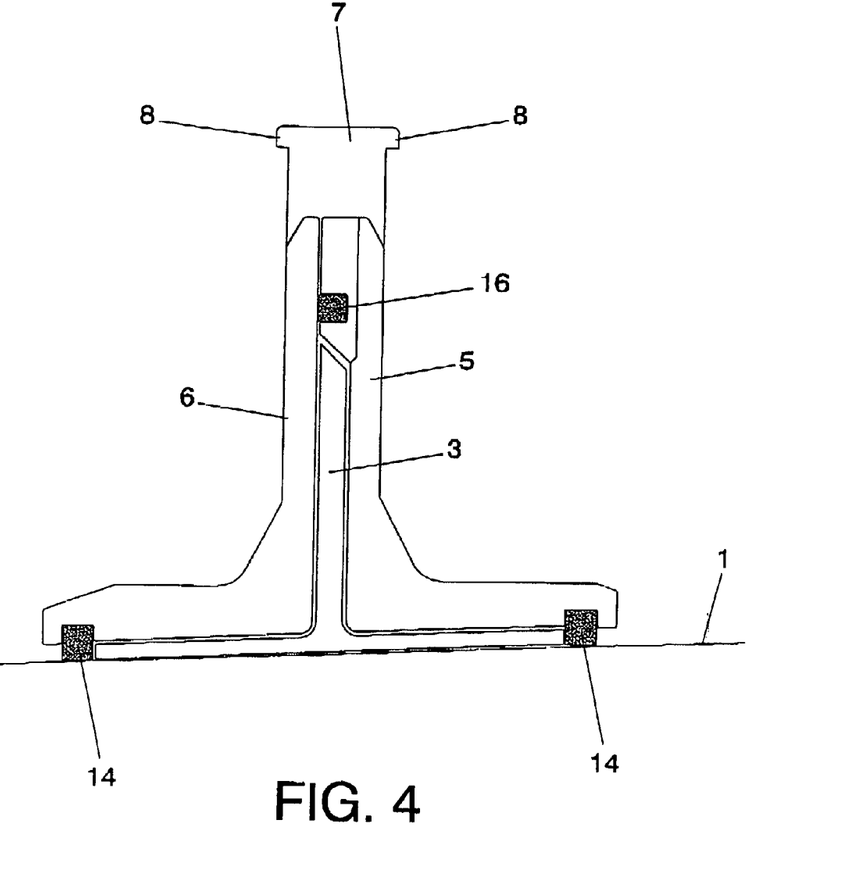
FIG. 4.—Is a cross-section view in elevation perspective of the same tool as in FIG. 2 including the stringer and with the assembly arranged on a cover.

In FIG. 2 we see the geometry of a tool piece 4 used according to the invention and formed by two angular elements 5 and 6, one wing of which (the horizontal one of the pair) rests on the cover 1 adapting itself perfectly to its surface and the other wings being facing and parallel to the distance corresponding to the thickness of the core of the stringer 3 (see FIG. 4).

Figure 5:
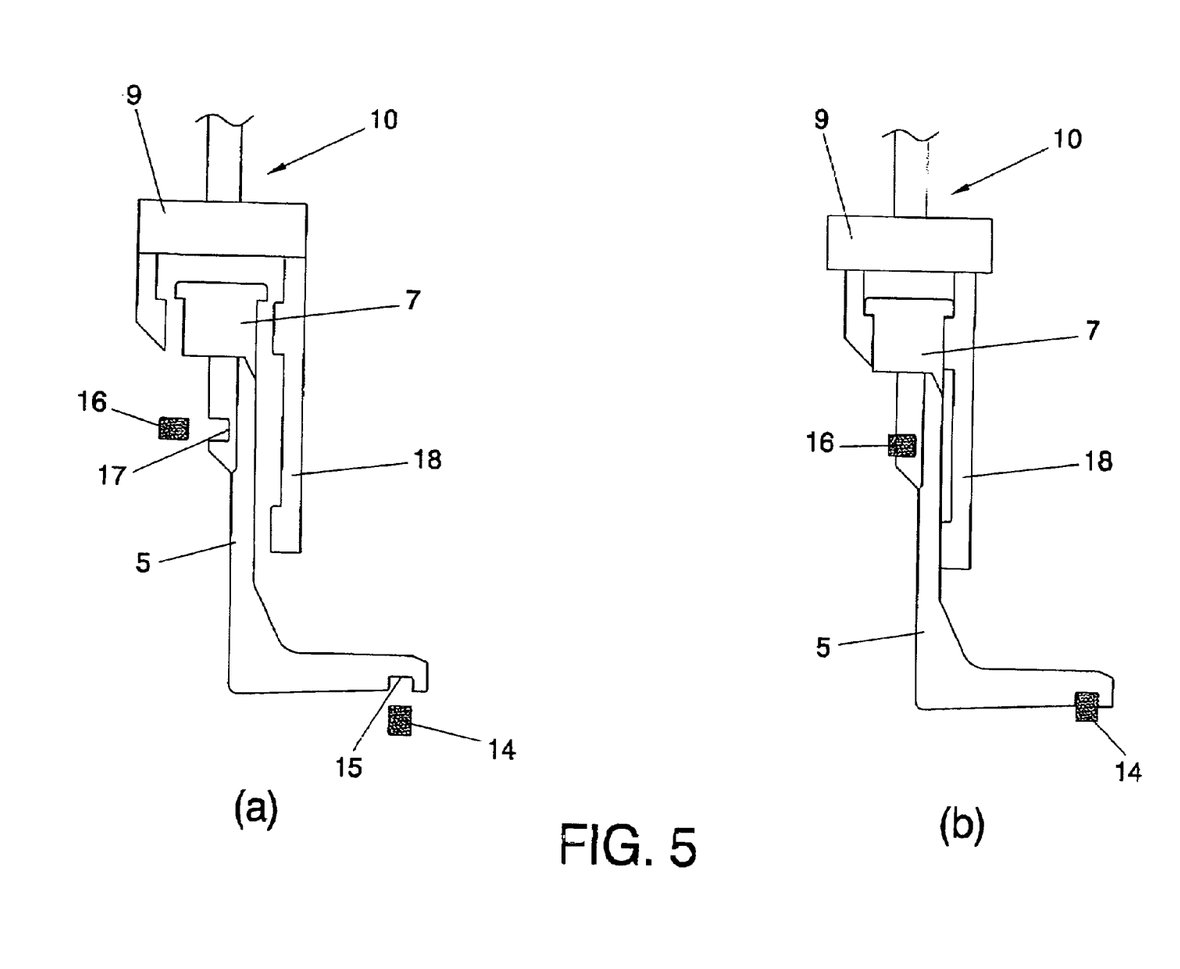
FIG. 5.—Is a schematic view in two positions a) and b) of the action of a robot grasping one of the angular elements of the tool using the clamps of its head.
Figure 6:
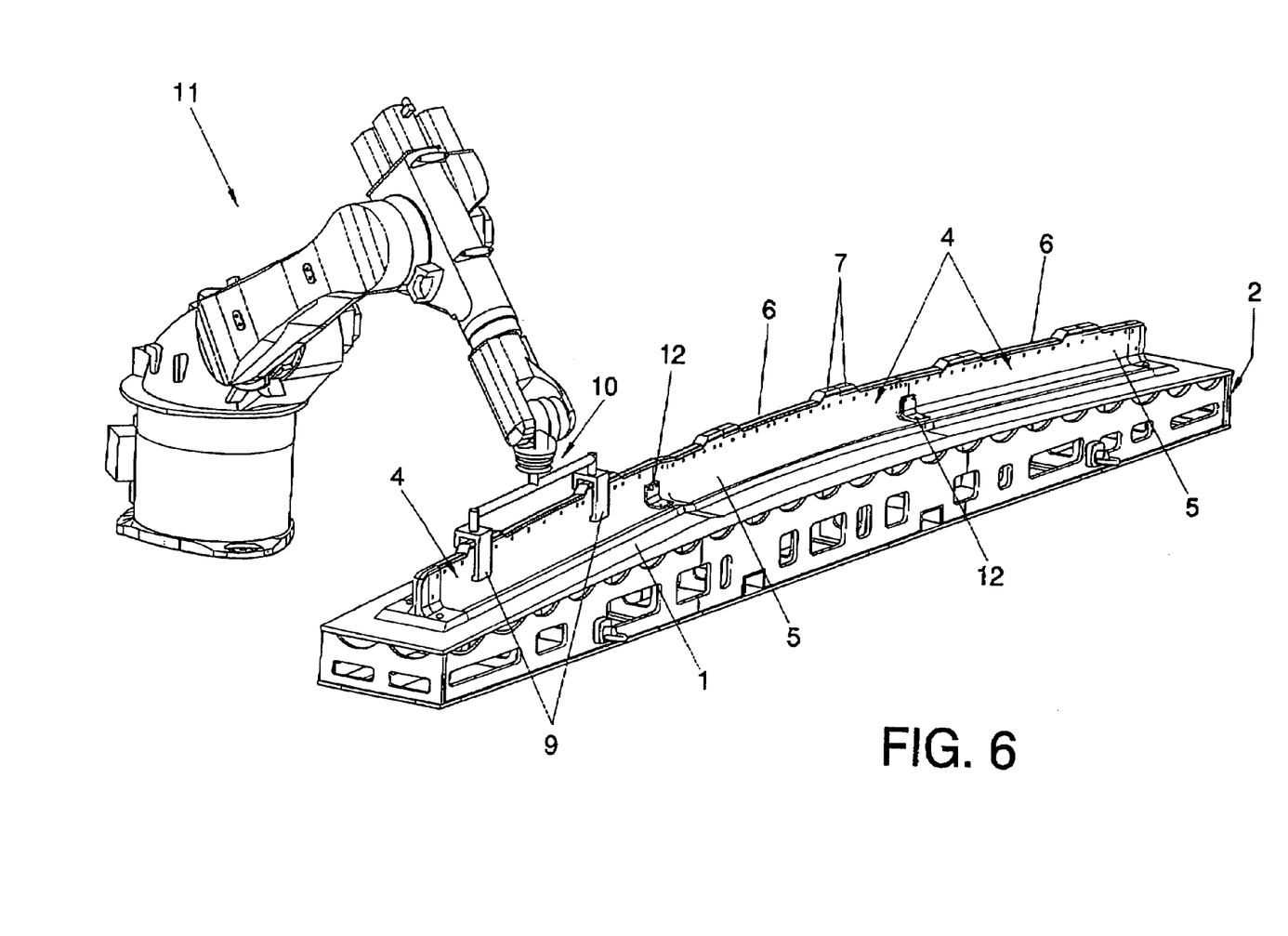
FIG. 6.—Is a perspective view of a robot with the head connected to a tool piece for its assembling following curing in an autoclave.
Figure 7:
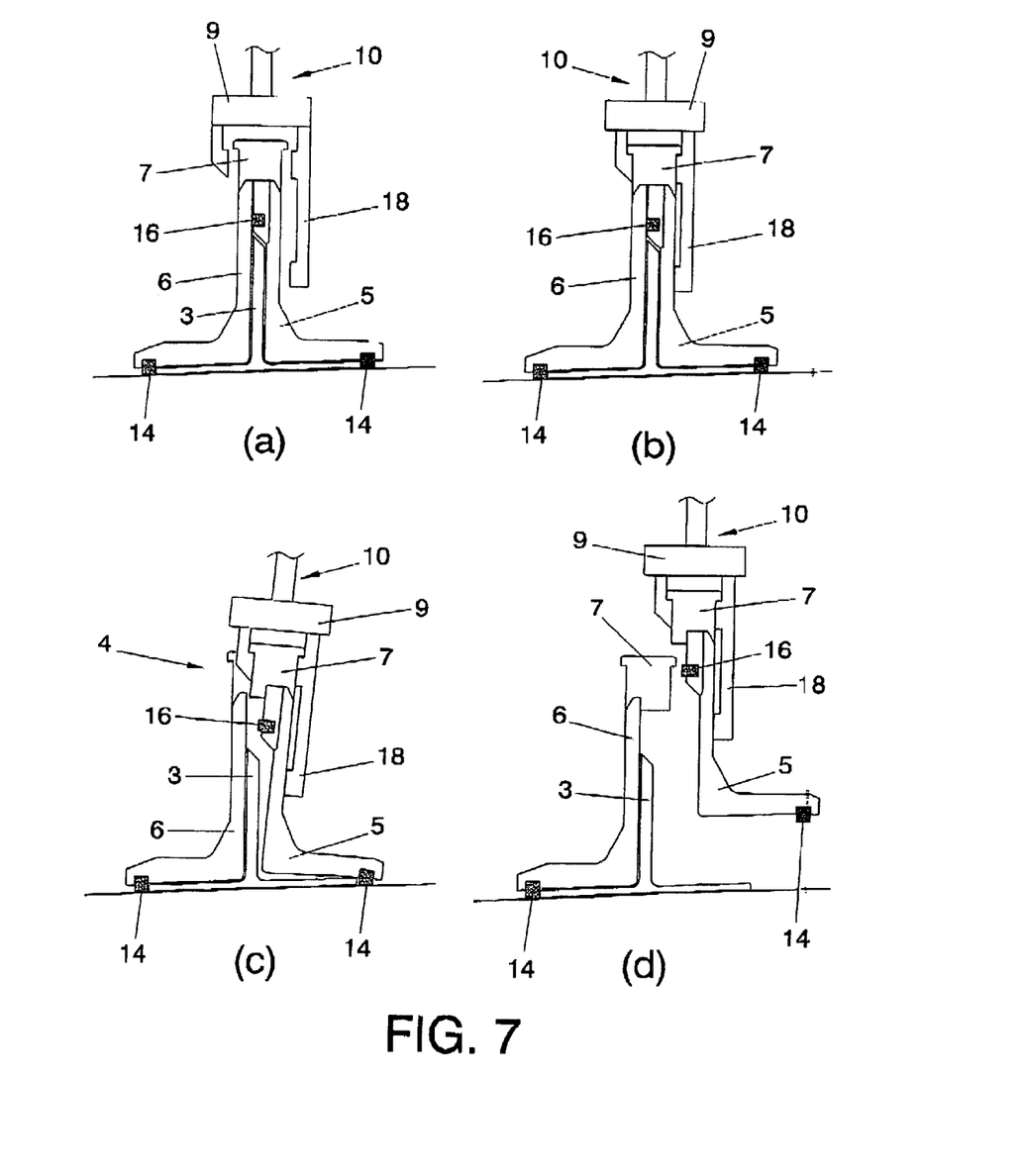
FIG. 7.—Is a schematic view in four positions a), b), c) and d), respectively showing the phases of positioning the head, grasping of the angular element, rotation of the head, and extraction of the angular element.

The angular elements 5 and 6 include a pair of battlements 7 on top of them endowed in this example of embodiment with a small longitudinal rib 8 for being grasped by the clamps 9 of the head 10 of the robot 11 (see FIG. 6) for the safe handling of the angular elements 5 and 6, as it can be seen in FIGS. 5 and 7.

Figure 3:
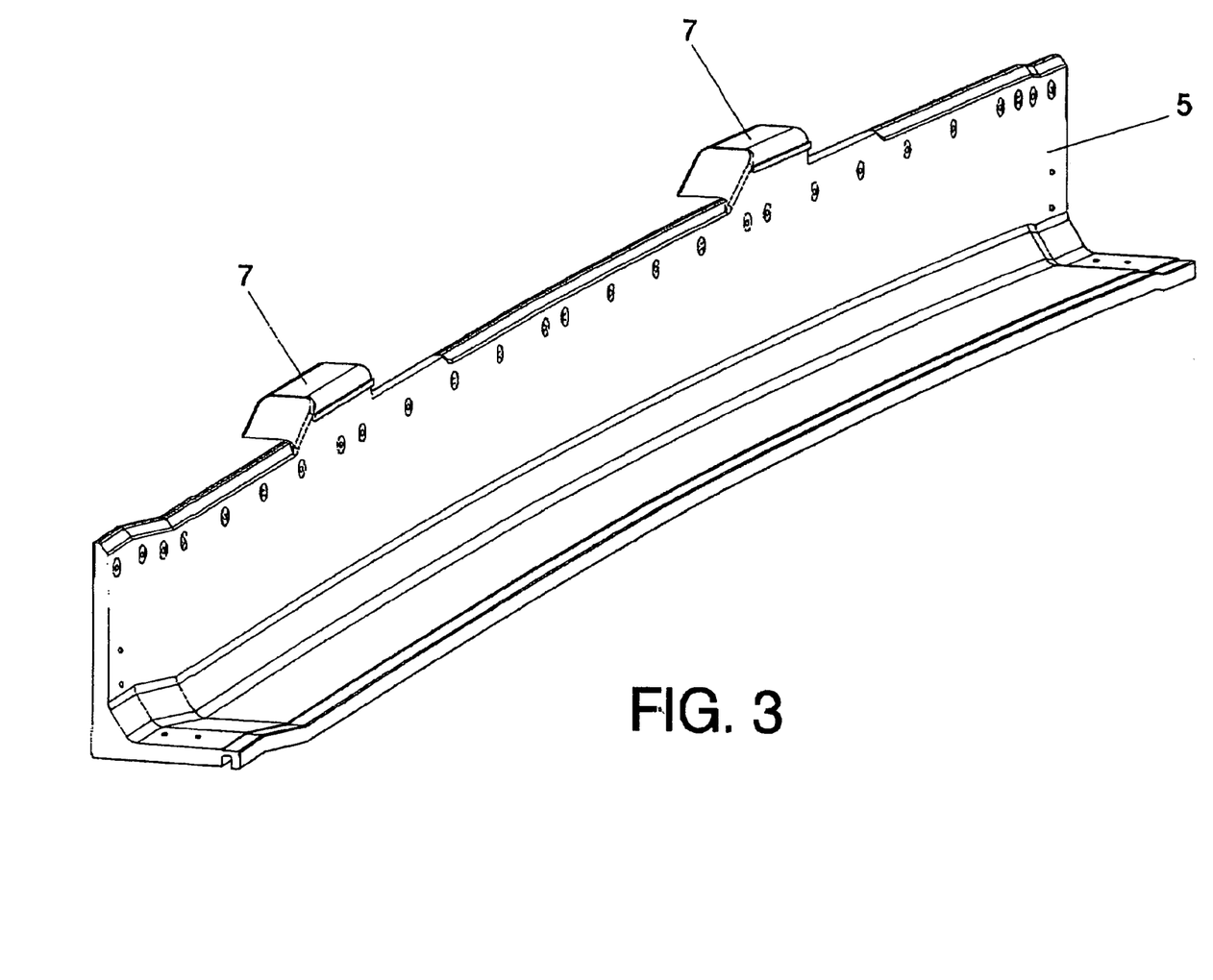
FIG. 3.—Is a view similar to FIG. 1, showing just one of the angular elements of the tool.

The battlements 7 of either of the angular elements 5 or 6 comprising a tool piece 4 have a projecting part that covers the thickness of the facing or paired angular element and is retained in it as can be seen in FIGS. 3 and 4. The battlements 7 also make linear contact with each other as do the different tool pieces 4 which are linked one to another until the stringer 3 is completely covered (see FIG. 6). The different sections of angular elements 5 and 6 are joined together linearly with the coupling pieces 12, and also located at the ends of the stringer are some closure covers 13 which are applied facing against the respective tool pieces 4 of the ends (see FIG. 6).

Returning to FIG. 4, the angular elements 5 and 6 made of INVAR material are applied against the cover 1 by means of closure strips 14 fitted into the longitudinal grooves 15. There is also a closure strip 16 in the lateral housing 17 of one of the angular elements 5 (position d of FIG. 7) in order to isolate the stringer 3 from the vacuum that will be created afterwards in the base that will cover the assembly for its immobility.

In FIG. 5, the grasping of an angular element 5 with the clamps 9 can be seen for its transfer to the correct location on the cover 1. The open clamps 9 (position a) are safely closed beneath the small ribs 8 (position b).

Finally, in FIG. 7 there are four sequential positions for the assembling of the tool pieces 4, starting from the position of the FIG. 6, once it has exited from the autoclave and the tool has to be removed (starting position of FIG. 6). In position a) of this FIG. 7, the two clamps 9 of the head 10, which are open, face the battlements 7 of the angular element 5 and are closed (position b) grasping the angular element 5. In position c), the rotation of the head 10 takes place in order to separate (unstick) one of the angular elements from the tool, specifically angular element 5. This angular element 5 can then be easily extracted (position d). The same operation is performed on all the angular elements 5 on that side and then the ones on the opposite side are extracted.

In order not to change the position of the clamps 9 of the head 10 of the robot 11, depending on the different lengths that the tool pieces 4 can have, provision has been made for the distance between said clamps 9 to be fixed and corresponding to that existing between the battlements 7 of either of the angular elements 5 or 6. In order to facilitate the assembling when inclining the angular element (by rotation of the head 9), one of the jaws 18 making up the pincer 9 is of greater length in order to provide optimum support for this angular element 5.

Located in the vicinity of the robot 11 are some suitable containers for placing the tool pieces 4 (angular elements 5 and 6).

The invention claimed is:

1. Positioning, Handling And Assembling System For Manufacture Of Aeronautical Parts, defined basically by structures of spars and various stiffening ribs, with carbon fiber cover and stringers, where the stringers are joined to the cover by cobonding, with some positioning tools being located and a vacuum bag which fixes the aeronautical part during polymerization in autoclave, wherein it includes a spherical type robot (11) with an articulated arm with six axes and a head (10) adapted to handling the tools, an external axis for displacement of the robot and some containers for storage of some extracted tools, said tools of the stringers (3) being defined by angular sections (5, 6) or "L" shaped profiles of INVAR material which copy the geometry of the stringer (3) when they are positioned in pairs on one side and the other of them, being linked together and located on the cover (1) in the specified places, said tool pieces (4) having some battlements (7) in the upper part of each of them for connection of the head (10) of the robot (11) in the assembly and dismantling operations.

2. Positioning, Handling And Assembling System For Manufacture Of Aeronautical Parts, according to claim 1, wherein a horizontal wing of the angular sections (5, 6) or "L" shaped profiles comprises a housing or channel (15) in its application surface on the cover (1), for location of a sealing strip (14).

3. Positioning, Handling And Assembling System For Manufacture Of Aeronautical Parts, according to claim 1, wherein the head (10) of the robot (11) has two clamps (9) which grasp at the same time the two battlements (7) of the same angular section (5, 6) of the tool piece (4), having each pincer (9) at least two jaws (18), with one of the jaws (18) of the pair forming each pincer (9) having a descending extension on which the angular element (5, 6) rests during its detachment by rotation in order to stabilize the same during removal from a mold.

4. Positioning, Handling And Assembling System For Manufacture Of Aeronautical Parts, according to claim 1, wherein the battlements (7) of the tool pieces (4) have some small longitudinal ribs (8) as safety means in a securing of the pincer (9) by the head (10).

* * * * *